United States Patent
Cobb, Jr.

(10) Patent No.: US 6,382,176 B1
(45) Date of Patent: May 7, 2002

(54) METHOD FOR INJECTING AND COMBUSTING FUEL WITH A PISTON HEAD HAVING A TOP SURFACE RECESS

(75) Inventor: William T. Cobb, Jr., St. Petersburg, FL (US)

(73) Assignee: Design & Manufacturing Solutions, Inc., Tampa, FL (US)

( * ) Notice: Subject to any disclaimer, the term of this patent is extended or adjusted under 35 U.S.C. 154(b) by 0 days.

(21) Appl. No.: 09/588,882

(22) Filed: Jun. 7, 2000

(51) Int. Cl.⁷ ............................................... F02B 23/10
(52) U.S. Cl. ................. 123/298; 123/65 PE; 123/73 C; 123/305; 123/661
(58) Field of Search ............................ 123/65 PE, 73 C, 123/257, 276, 279, 294, 298, 305, 661

(56) References Cited

U.S. PATENT DOCUMENTS

| | | | |
|---|---|---|---|
| 3,707,143 A | * 12/1972 | Reese et al. | 123/73 C |
| 4,056,080 A | * 11/1977 | Rutz et al. | 123/298 X |
| 4,770,138 A | * 9/1988 | Onishi | 123/276 |
| 5,107,810 A | * 4/1992 | Wu et al. | 123/298 |
| 5,284,111 A | 2/1994 | Geyer et al. | 123/73 C |
| 5,443,045 A | 8/1995 | Marconi | 123/299 |
| 5,662,074 A | * 9/1997 | Nagano | 123/65 PE |
| 5,699,766 A | * 12/1997 | Saito | 123/305 X |

FOREIGN PATENT DOCUMENTS

JP          8-21247      *  1/1996

* cited by examiner

*Primary Examiner*—Tony M. Argenbright
(74) *Attorney, Agent, or Firm*—Harrington & Smith, LLP (57) ABSTRACT

A method of controlling fuel injection flow in a cylinder of an internal combustion engine. A piston head of the engine is provided with a combined flow redirector and holding bowl recess extending into a top side of the piston head. A fuel injection port is provided in the cylinder in a bottom portion of a combustion chamber of the cylinder located above the top side of the piston head when the piston is at a bottom dead center position. Fuel is injected from the injection port into the recess. The step of injecting comprises injecting the fuel at a first velocity when the engine is operating at a first speed, and injecting the fuel at a second faster velocity when the engine is operating at a second faster speed.

26 Claims, 4 Drawing Sheets

METHOD FOR INJECTING AND COMBUSTING FUEL WITH A PISTON HEAD HAVING A TOP SURFACE RECESS

BACKGROUND OF THE INVENTION

1. Field of the Invention

The present invention relates to internal combustion engines and, more particularly, to a piston head having a top surface recess.

2. Prior Art

The small two-stroke engine has many desirable characteristics including: simplicity of construction, low cost of manufacturing, high power-to-weight ratios, high speed operational capability and, in many parts of the world, ease of maintenance with simple facilities. The prominent drawback of the simple two-stroke engine is the loss of a portion of the fresh unburned fuel charge from the cylinder during the scavenging process. This leads to poor fuel economy and high emission of unburned hydrocarbon, thus rendering the simple two-stroke engine incapable of compliance with increasingly stringent governmental pollution restrictions. This drawback can be relieved by separating the scavenging of the cylinder, with fresh air, from the charging of the cylinder, with fuel. This separation can be achieved by injecting the liquid fuel into the cylinder or more preferably by injecting the fuel charge by utilizing a pressurized air source, separate from the fresh air scavenge, to spray the fuel into the cylinder.

SUMMARY OF THE INVENTION

In accordance with one embodiment of the present invention, a method of controlling fuel injection flow in a cylinder of an internal combustion engine is provided comprising steps of providing a piston head of the engine with a combined flow redirector and holding bowl recess extending into a top side of the piston head; providing a fuel injection port in the cylinder in a bottom portion of a swept volume of the cylinder located above the top side of the piston head when the piston is at a bottom dead center position; injecting fuel from the injection port into the recess, wherein the step of injecting comprises; injecting the fuel at a first velocity when the engine is operating at a first speed, and injecting the fuel at a second faster velocity when the engine is operating at a second faster speed. The recess holds a substantial portion of the injected fuel when the fuel is injected at the first velocity which is then subsequently transported in the recess to a spark plug of the engine as the piston moves towards a top dead center position, and the recess redirects a substantial portion of the injected fuel out of the recess when the fuel is injected at the second faster velocity.

In accordance with one method of the present invention a method of controlling fuel injection flow in a cylinder of an internal combustion engine is provided comprising steps of providing a piston head of the engine with a combined flow redirector and holding bowl recess extending into a top side of the piston head; providing a fuel injection port in the cylinder in a bottom portion of a swept volume of the cylinder located above the top side of the piston head when the piston is at a bottom dead center position; injecting fuel from the injection port into the recess. The step of injecting comprises injecting the fuel at a first velocity when the engine is operating at a first speed, and injecting the fuel at a second faster velocity when the engine is operating at a second faster speed. The recess holds a substantial portion of the injected fuel when the fuel is injected at the first velocity which is then subsequently transported in the recess to a spark plug of the engine as the piston moves towards a top dead center position. The recess redirects a substantial portion of the injected fuel out of the recess when the fuel is injected at the second faster velocity.

In accordance with another method of the present invention a method of combusting fuel in a cylinder of an internal combustion engine is provided comprising steps of injecting fuel into the cylinder while a piston of the engine is proximate a bottom dead center position, the fuel being injected into a bowl recess in a top surface of the piston; transporting a substantial portion of the fuel, injected into the cylinder, by the bowl recess to a spark plug of the engine as the piston moves towards a top dead center position; and igniting the fuel by the spark plug as the piston approaches the top dead center position, wherein the substantial portion of the fuel stays in the bowl recess between injection of the fuel into the bowl recess and ignition of the fuel by the spark plug.

In accordance with one embodiment of the present invention, an internal combustion engine is provided comprising a cylinder, a piston movably mounted in the cylinder, and a fuel injection system for injecting fuel into the cylinder. The piston has a top surface with a combined flow redirection and holding bowl recess. The fuel injection system has an injection port located in a lateral side wall of the cylinder at a bottom section of a swept volume of the cylinder proximate the recess in the top surface of the piston for injecting fuel into the recess with a small space between the injection port and a receiving area of the recess when the piston is located proximate a bottom dead center position.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1A:
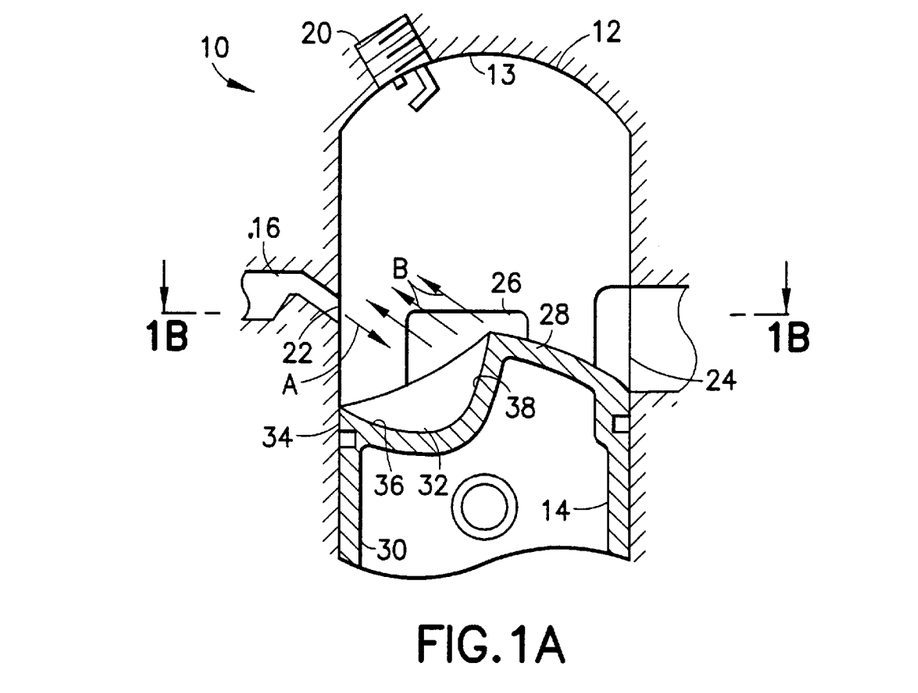
FIG. 1A is a schematic cross-sectional view of a portion of an internal combustion engine incorporating features of the present invention.

Referring to FIG. 1A, there is shown a schematic cross-sectional view of an internal combustion engine 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used. A particular field of application of the invention is a two-stroke internal combustion engine. The specific application described is to a small high speed two-stroke engine, such as utilized in handheld power equipment such as leaf blowers, string trimmers and hedge trimmers, also in wheeled vehicle applications such as mopeds, motorcycles and scooters and in small outboard boat engines.

The engine 10 is preferably a two-cycle internal combustion engine. The specific application described is to a small high speed two-stroke engine, such as utilized in handheld power equipment such as leaf blowers, string trimmers and hedge trimmers, also in wheeled vehicle applications such as mopeds, motorcycles and scooters and in small outboard boat engines. The small two-stroke engine has many desirable characteristics, that lend themselves to the above applications, including: simplicity of construction, low cost of manufacturing, high power-to-weight ratios, high speed operational capability and, in many parts of the world, ease of maintenance with simple facilities.

In a preferred embodiment of the present invention, the displacement size of the engine is about 16 cc to about 100 cc, but could be larger or smaller. These sizes of engines are used for such things as string trimmers, chain saws, leaf blowers, and other hand held power tools. The engine could also be used on a tool such as a lawn mover, snow blower or motor boat outboard engines. The engine 10 generally comprises a cylinder 12, a piston 14 movably mounted in the cylinder, a fuel injection system 16, and a spark plug 20. The engine 10 obviously has other conventional components such as a crankcase, etc. which are not shown merely for the sake of simplicity.

Figure 1B:
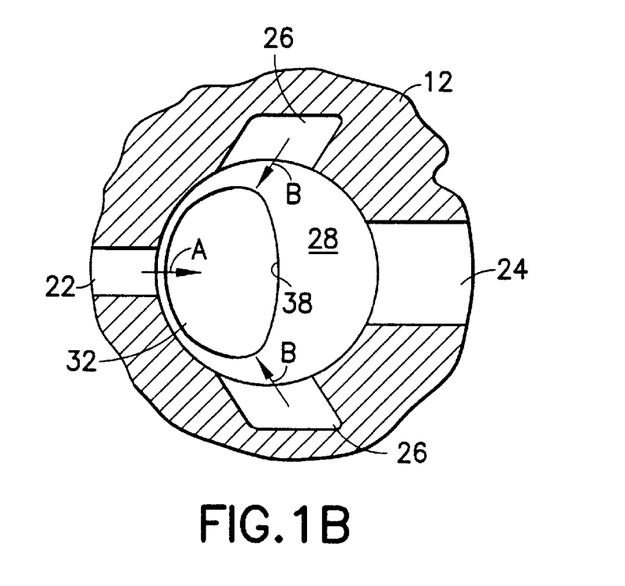
FIG. 1B is a cross-sectional view of the engine shown in FIG. 1A taken along line 1B–1B.

Referring also to FIG. 1B, the cylinder 12 generally a fuel entry port 22, an exhaust port 24, and two air transfer channels 26. The fuel entry port 22 is part of the fuel injection system 16. In a preferred embodiment the fuel injection system is a combined air and fuel injection system such as disclosed in the following commonly owned U.S. patent applications, Ser. No. 09/065,374 now U.S. Pat. No. 6,079,379; Ser. No. 09/138,244 now U.S. Pat. No. 6,273,037; Ser. No. 09/504,056 now U.S. Pat. No. 6,293,235; and/or Ser. No. 09/533,752 which are hereby incorporated by reference in their entireties. However, any suitable type of fuel injection system could be used including a fuel electro-injector which does not use air from the crankcase or does not use a reflected compression wave. In this embodiment the fuel entry port 22 is angled in a downward direction (i.e.: angled in a direction away from the top end 13 of the cylinder 12). Thus, fuel and air entering the cylinder 12 through the port 22 can be directed downward as indicated by arrow A towards the top end 28 of the piston head 30. However, in an alternate embodiment the entry port 22 need not be angled in a downward direction if the piston head 30 is suitably shaped to function as described below.

The injection port 22 is located at a bottom section of the swept volume of the cylinder, proximate the recess 32 in the top surface of the piston when the piston is proximate a bottom dead center (BDC) position, for injecting fuel into the recess 32 with a very small space or gap between the injection port 22 and a receiving area of the recess 32. The swept volume is the volume of the cylinder which the piston head 30 sweeps or moves through. As noted above, the injection port is preferably located in a lateral side wall of the cylinder and is pointed in a downward direction towards the top surface of the piston at BDC.

In this embodiment the exhaust port 24 is located on an opposite side of the cylinder 12 from the fuel entry port 22. However, it need not be directly opposite. In the embodiment shown, a top of the injection port 22 is located below a top of the exhaust port 24. The top of the injection port 22 is also located above a top of the transfer channels 26. However, any suitable channel and port 26, 24, 22 relative positioning could be provided. For example, the top of the injection port 22 could be below a top of the transfer channels, such as when the fuel injector is electro-mechanical. In this embodiment they cylinder 12 has two transfer channels 26 on opposite sides of the cylinder. However, any suitable number of transfer channels could be provided, and at any suitable position(s). The transfer channels 26 are adapted to transport air scavenged from the crankcase (not shown) below the bottom of the piston head 30, into the area of the cylinder 12 above the piston head 30 in a direction as illustrated by arrows B.

The top end 28 of the piston head 30 comprises a general rounded mound shaped profile, but includes a recess 32. As further understood from the description below, the recess 32 forms a combined high speed flow redirector and a low speed holding bowl. In this embodiment the recess 32 extends from a side 34 of the piston head proximate the injection port 22, about half way across the width of the piston head, and outward towards the transfer channels 26 to have a general oval or egg shaped top plan view as illustrated by FIG. 1B. However, as seen in FIG. 1A, because of the general rounded mound shaped profile of the top end 28, and because of the shape of the recess, the recess 32 has a bottom wall 36 from the side 34 that has a relatively small slope and a back wall 38 which has a relatively large slope. The recess 32 has a general three dimensional inwardly curved shape. However, in alternate embodiments other shapes for the recess 32 could be provided.

Figure 2:
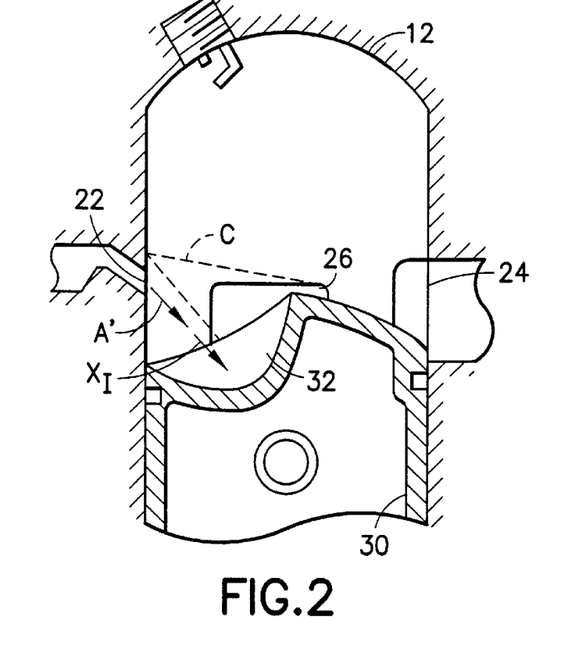
FIG. 2 is a schematic view as in FIG. 1A with the piston proximate a bottom dead center position and the engine running at an idle speed.
Figure 3:
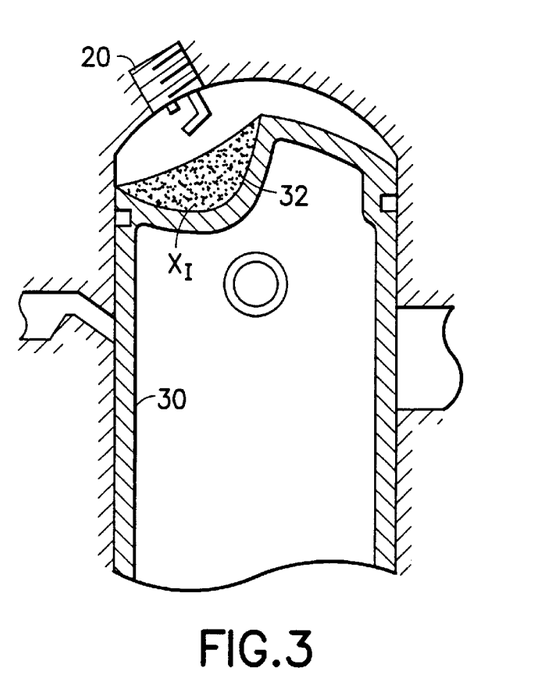
FIG. 3 is a schematic view as in FIG. 2 with the piston moving upward from the bottom dead center position shown in FIG. 2 towards the spark plug ignition position shown in FIG. 4.
Figure 4:
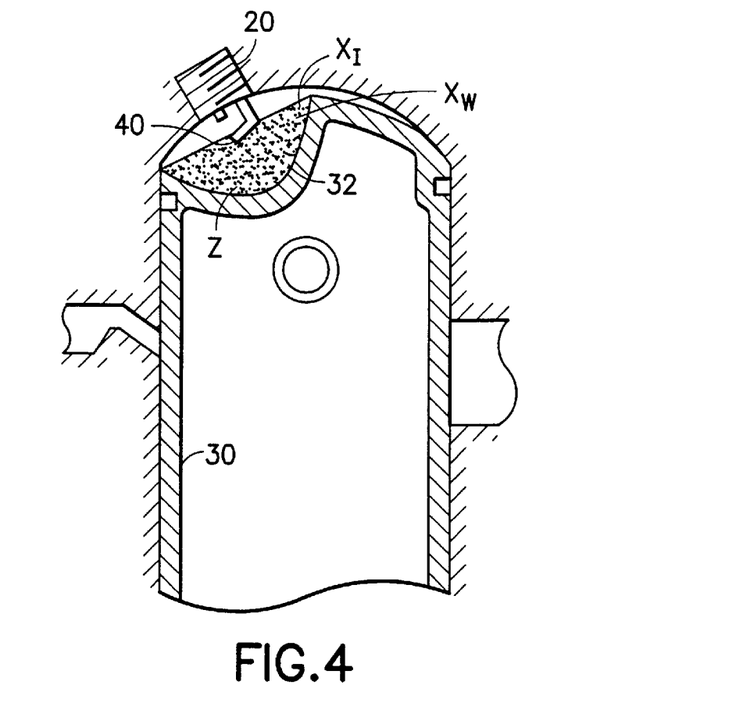
FIG. 4 is a schematic view as in FIG. 2 with the piston at a spark plug ignition position when ignition by the spark plug occurs.

The engine 10 can operate in at least two speeds; idle and wide open throttle (WOT). Referring now to FIGS. 2, 3 and 4 operation of the engine at idle speed will be described. FIG. 2 shows the piston head 30 proximate a bottom dead center position with fuel/air mixture or charge $X_I$ being injected from the injection port 22 into recess 32 in direction A along a path A'. In one embodiment the fuel/air charge $X_I$ can be injected between about 60° before and after BDC of the piston position. In this embodiment the injection port 22 is piston ported (i.e.: opened and closed by the piston head 30 as the piston head moves up and down). Therefore, placement of the injection port 22 along the height of the cylinder wall will determine at what angles before and after BDC fuel will be injected into the cylinder. Thus, the position of the piston when fuel injection occurs relative to BDC can be selected by the manufacturer to more or less than 60°. The present invention could also be used with an injection system that is not piston ported. At idle speed the air B (see FIGS. 1A and 1B) out of the transfer channels 26 forms an air barrier or air fence above the recess 32 and above the path A' of fuel/air charge $X_I$ from the port 22 into the recess 32 as illustrated by dashed lines C in FIG. 2. Thus, the injected fuel and air charge $X_I$ is substantially kept below the air fence C. The velocity of the injected fuel and air charge $X_I$ is relatively slow to substantially prevent redirection by the recess 32 and breaching through the air fence C. The fuel and air injection $X_I$ is, thus, also substantially prevented from directly exiting out the exhaust port 24. As the piston head 30 moves towards a top dead center (TDC)

position, the air fence C ceases to exist, but the recess 32 functions as a bowl or pocket to retain and transport the injected fuel and air $X_I$ to the spark plug as illustrated in FIGS. 3 and 4. The majority of the fuel and air $X_I$ injected through the port 22 does not have an opportunity to exit the recess 32 prior to ignition by the spark plug 20. Ignition at idle preferably very close to TDC, such as about 20°–30° before TDC. The position of the piston head 30 at ignition at idle speed is preferably such that the recess 32 forms a majority of the combustion zone Z. A portion 40 of the spark plug need 20 could also project into the recess 32. However, in alternate embodiments the spark plug need not project into the recess 32 and/or the recess 32 might only form a substantial portion of the combustion zone Z at idle speed, such as 30 or 40 percent.

Figure 5:
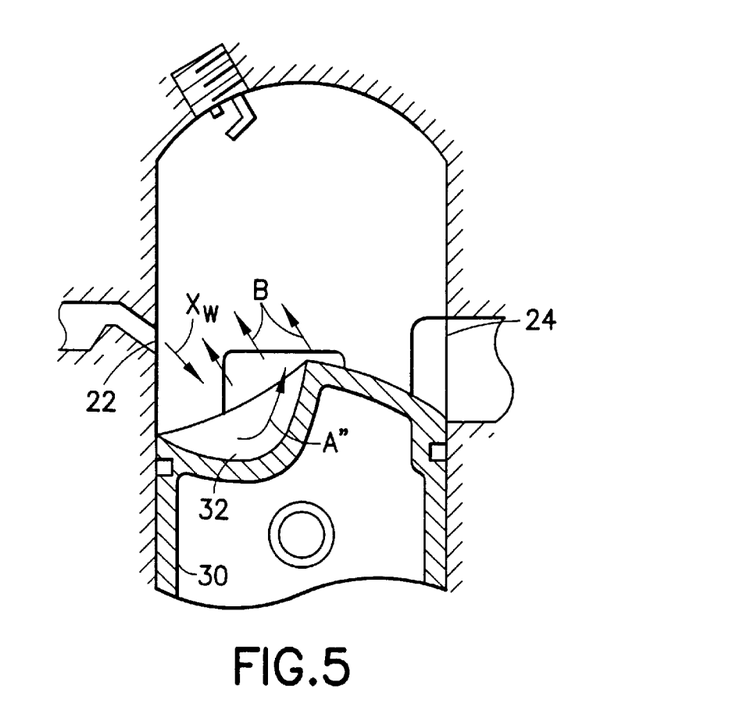
FIG. 5 is a schematic view as in FIG. 2 with the engine running at a wide open throttle position.
Figure 6:
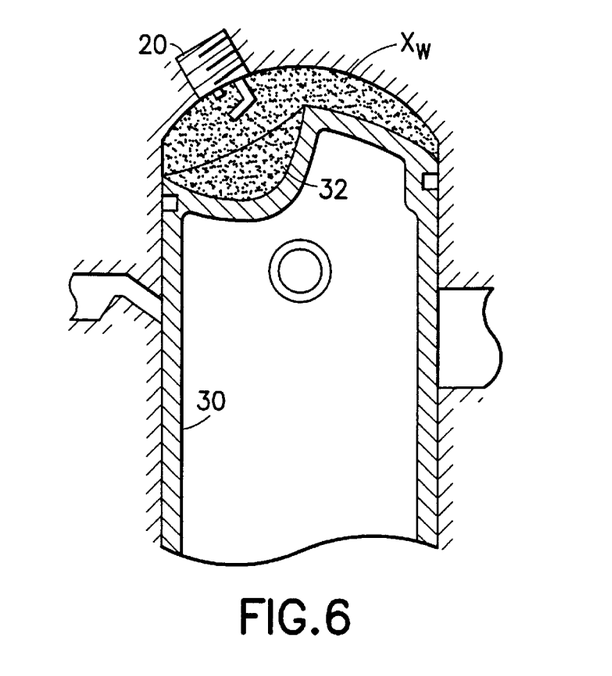
FIG. 6 is a schematic view as in FIG. 3 with the piston moving upward from the position shown in FIG. 5 towards the spark plug ignition position shown in FIG. 4 under wide open throttle conditions.

Referring now to FIGS. 4, 5 and 6, operation of the engine 10 at wide open throttle (WOT) will be described. Referring to FIG. 5, the velocity and quantity of the fuel and air injection or charge $X_W$ from injection port 22 is relatively faster and larger then at idle speed. The shape of the recess 32 and the velocity and quantity of the injection $X_W$ combine to pass the fuel and air injection into the air B from the transfer channels 26 to mix with the air B above the piston head to thereby enhance mixing. The recess 32 redirects the injection $X_W$ from path A' to path A" in an upward direction and away from the exhaust port 24. This redirection is preferably about 120° to about 150° from the initial injection direction A into the recess 32 from the port 22. As seen in comparing FIG. 6 to FIG. 3, the quantity $X_W$ is not restrained in the recess 32, mixes with the air above the piston head 30 as the piston head moves towards TDC, and is compressed with the air as the piston head reaches the ignition point as shown in FIG. 4. At WOT the charge $X_W$ is substantially located in the recess 32 when spark plug ignition occurs (FIG. 4), such as about 50% of $X_W$ being located in the recess 32. However, the percent of $X_W$ in the recess 32 at ignition could be more or less, such as about 35%, 40%, 45%, 55%, 60%, 65%, etc. This could easily be determined based upon what percent of the total combustion zone Z the recess 32 comprises at ignition.

The present invention provides an improved method of controlling fuel injection flow in a cylinder of an internal combustion engine to accommodate different operating speeds and load conditions of the engine and reduce pollutants, such as release of unburned hydrocarbons. The piston head of the engine is provided with a combined flow redirector and holding bowl recess extending into a top side of the piston head. The fuel injection port in the cylinder is provided in a bottom portion of the swept volume of the cylinder located above the top side of the piston head when the piston is at a bottom dead center position. A fuel and air charge is injected from the injection port into the recess, wherein the step of injecting comprises: injecting the fuel and air at a first velocity and quantity when the engine is operating at a first speed, and injecting the fuel and air at a second faster velocity and second larger quantity when the engine is operating at a second faster speed. In an alternate embodiment, the velocities of injections could be the same, with merely the quantities of injection being different at different engine operating speeds or loads. In another alternate embodiment, the quantities of injections could be the same, but the velocities of injection could be different at the different engine operating speeds or engine load conditions. The recess holds a substantial portion of the injected fuel when the fuel is injected at the first velocity and quantity which is then subsequently transported in the recess to a spark plug of the engine as the piston moves towards a top dead center position, and the recess redirects a substantial portion of the injected fuel out of the recess when the fuel is injected at the second faster velocity and quantity to mix with separately scavenged air. The cylinder comprises a transfer channel for transferring air from the crankcase of the engine into the combustion chamber. A top of the transfer channel is located below the fuel injection port. However, the path of the air from the transfer channel is directed such that at least some of the air is injected directly from the transfer channel above the path of initial injection of the fuel/air charge from the injection port to a location at the cylinder wall above the injection port.

The method can comprise directing the injecting air from the transfer channel(s) into the cylinder above the fuel injected at the injection port to form an air fence above the recess when the engine is operating at the first speed to trap the substantial portion of the fuel in the recess when the fuel is injected into the recess. The step of injecting fuel can direct the fuel in a downward direction from a lateral side of the cylinder towards the top side of the piston head. The step of injecting fuel can inject the fuel from the injection port at a location below a top of an exhaust port from the cylinder. The step of injecting the fuel at the second faster velocity can comprise the recess redirecting a path of the substantial portion of the injected fuel out of the recess between about 120° to 150° from an initial injection direction into the recess. The step of igniting the fuel can comprise the recess defining a majority of a combustion area when ignition occurs. With the present invention a method of combusting fuel in a cylinder of an internal combustion engine can be provided comprising steps of: injecting fuel into the cylinder while a piston of the engine is proximate a bottom dead center position, the fuel being injected into a bowl recess in a top surface of the piston; transporting a substantial portion of the fuel, injected into the cylinder, in the bowl recess to a spark plug of the engine as the piston moves towards a top dead center position; and igniting the fuel by the spark plug as the piston approaches the top dead center position, wherein the substantial portion of the fuel stays in the bowl recess between injection of the fuel into the bowl recess and ignition of the fuel by the spark plug.

Figure 7:
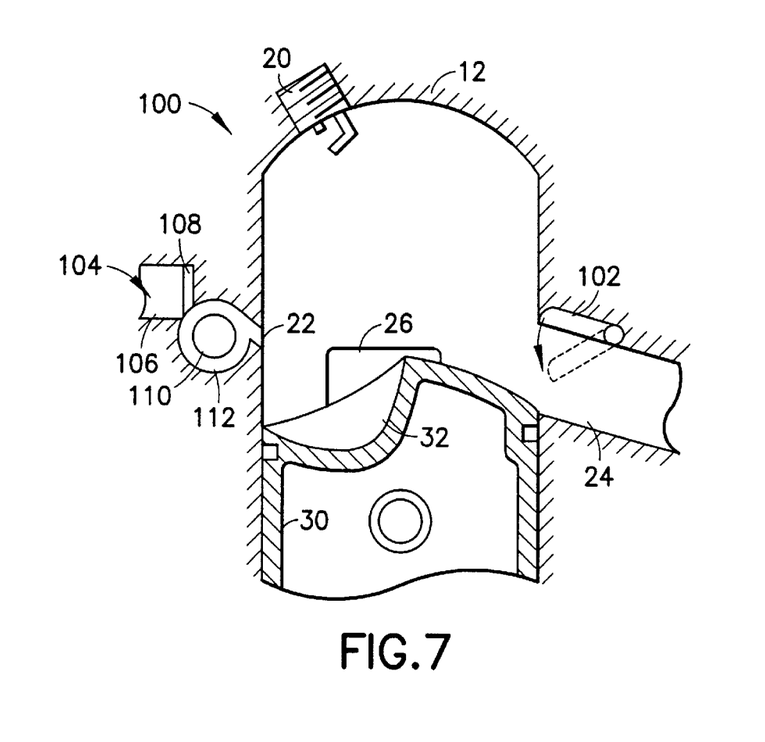
FIG. 7 is a schematic view as in FIG. 1A of an alternate embodiment of the present invention.

Referring also to FIG. 7 an alternate embodiment of the present invention will be described. In this embodiment the engine 100 includes an exhaust valve 102. The valve 102 is located at the exhaust port 24 and can be moved to the blocking position shown in dotted lines to increase fuel trapping in the cylinder 12 during fuel injection. The fuel injection system 104 includes a conduit 106 from a carburetor assembly (not shown), a check valve 108, an accumulator channel 110 with a swirl chamber 112 and the angled injection port 22. The accumulator channel 110 preferably has an opposite end connected to the crankcase. The carburetor (not shown) is preferably a dual carburetor and crankcase lubrication system as disclosed in U.S. Pat. application Ser. No. 09/518,578.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of controlling fuel injection flow in a cylinder of an internal combustion engine comprising steps of:

providing a piston head of the engine with a combined flow redirector and holding bowl recess extending into a top side of the piston head;

providing a fuel injection port in the cylinder in a bottom portion of a swept volume of the cylinder located above the top side of the piston head when the piston is at a bottom dead center position;

injecting fuel from the injection port into the recess, wherein the step of injecting comprises:
  injecting the fuel at a first velocity when the engine is operating at a first speed, and
  injecting the fuel at a second faster velocity when the engine is operating at a second faster speed,
wherein the recess holds a substantial portion of the injected fuel when the fuel is injected at the first velocity which is then subsequently transported in the recess to a spark plug of the engine as the piston moves towards a top dead center position, and wherein the recess redirects a substantial portion of the injected fuel out of the recess when the fuel is injected at the second faster velocity.

2. A method as in Claim 1 wherein the cylinder comprises a transfer channel for transferring air from a crankcase of the engine into the combustion chamber, wherein a top of the transfer channel is located below the fuel injection port, and wherein at least some of the air from the crankcase is injected from the transfer channel above a path of the injected fuel from the injection port to the piston head.

3. A method as in Claim 1 further comprising injecting air into the combustion chamber above the fuel injected at the injection port to form an air fence above the recess when the engine is operating at the first speed to trap the substantial portion of the fuel in the recess when the fuel is injected into the recess.

4. A method as in Claim 1 wherein the step of injecting fuel directs the fuel in a downward direction from a lateral side of the cylinder towards the top side of the piston head.

5. A method as in Claim 4 wherein the step of injecting fuel injects the fuel from the injection port at a location below a top of an exhaust port from the cylinder.

6. A method as in Claim 1 further comprising moving a valve in an exhaust port to at least partially close the exhaust port during light engine load or idle operation of the engine.

7. A method as in Claim 1 wherein the step of injecting the fuel at the second faster velocity comprises the recess redirecting a path of the substantial portion of the injected fuel out of the recess between about 120° to 150° from an initial injection direction into the recess.

8. A method of combusting fuel in a cylinder of an internal combustion engine comprising steps of:
  injecting fuel into the cylinder while a piston of the engine is proximate a bottom dead center position, the fuel being injected into a bowl recess in a top surface of the piston;
  transporting a substantial portion of the fuel, injected into the cylinder, by the bowl recess to a spark plug of the engine as the piston moves towards a top dead center position;
  igniting the fuel by the spark plug as the piston approaches the top dead center position, wherein the substantial portion of the fuel stays in the bowl recess between injection of the fuel into the bowl recess and ignition of the fuel by the spark plug; and
  moving a valve in an exhaust port to at least partially close the exhaust port during light load or die speed operation of the engine.

9. A method as in Claim 8 wherein the step of igniting comprises the recess defining a majority of a combustion area when ignition occurs.

10. A method of combusting fuel in a cylinder of an internal combustion engine comprising steps of:
  injecting fuel into the cylinder while a piston of the engine is proximate a bottom dead center position, the fuel being injected into a bowl recess in a top surface of the piston;
  transporting a substantial portion of the fuel, injected into the cylinder, by the bowl recess to a spark plug of the engine as the piston moves towards a top dead center position; and
  igniting the fuel by the spark plug as the piston approaches the top dead center position, wherein the substantial portion of the fuel stays in the bowl recess between injection of the fuel into the bowl recess and ignition of the fuel by the spark plug,
  wherein the step of injecting comprises providing a fuel injection port in a lateral side wall of the cylinder in a bottom portion of a swept volume of the cylinder such that the fuel is injected into the cylinder very close to a top end of the piston.

11. A method as in Claim 10 wherein the fuel injection port is pointed in a downward direction such that the fuel is injected in a downward direction in the cylinder towards the top surface of the piston.

12. A method of combusting fuel in a cylinder of an internal combustion engine comprising steps of:
  injecting fuel into the cylinder while a piston of the engine is proximate a bottom dead center position, the fuel being injected into a bowl recess in a top surface of the piston;
  transporting a substantial portion of the fuel, injected into the cylinder, by the bowl recess to a spark plug of the engine as the piston moves towards a top dead center position; and
  igniting the fuel by the spark plug as the piston approaches the top dead center position, wherein the substantial portion of the fuel stays in the bowl recess between injection of the fuel into the bowl recess and ignition of the fuel by the spark plug;
  wherein the step of injection comprises:
    injecting the fuel at a first velocity when the engine is operating at a first speed, and
    injecting the fuel at a second faster velocity when the engine is operating at a second faster speed,
    wherein the recess redirects a substantial portion of the injected fuel out of the recess when the fuel is injected at the second faster velocity.

13. A method as in Claim 11 wherein the step of injecting the fuel at the second faster velocity comprises the recess redirecting a path of the substantial portion of the injected fuel out of the recess between about 120° to 150° from an initial injection direction into the recess.

14. A method of combusting fuel in a cylinder of an internal combustion engine comprising steps of:
  injecting fuel into the cylinder while a piston of the engine is proximate a bottom dead center position, the fuel being injected into a bowl recess in a top surface of the piston;
  transporting a substantial portion of the fuel, injected into the cylinder, by the bowl recess to a spark plug of the engine as the piston moves towards a top dead center position; and
  igniting the fuel by the spark plug as the piston approaches the top dead center position, wherein the substantial portion of the fuel stays in the bowl recess between injection of the fuel into the bowl recess and ignition of the fuel by the spark plug wherein the cylinder comprises a transfer channel for transferring air from a crankcase of the engine into the combustion chamber, wherein a top of the transfer channel is located below a fuel injection port, and wherein the air from the crankcase is injected from the transfer channel above a direct path of the injected fuel from the injection port to the recess in the top surface of the piston.

15. A method as in Claim 14 further comprising directing the injecting air directly from the transfer channel into the cylinder to a location above the injection port to form an air fence above the recess when the engine is operating at a first speed to trap the substantial portion of the fuel in the recess when the fuel is injected into the recess.

16. A method of combusting fuel in a cylinder of an internal combustion engine comprising steps of:

injecting fuel into the cylinder while a piston of the engine is proximate a bottom dead center position, the fuel being injected into a bowl recess in a top surface of the piston;

transporting a substantial portion of the fuel, injected into the cylinder, by the bowl recess to a spark plug of the engine as the piston moves towards a top dead center position; and igniting the fuel by the spark plug as the piston approaches the top dead center position, wherein the substantial portion of the fuel stays in the bowl recess between injection of the fuel into the bowl recess and ignition of the fuel by the spark plug, wherein the step of injecting fuel directs the fuel in a downward direction from a lateral side of the cylinder towards the top side of the piston.

17. A method as in Claim 16 wherein the step of injecting fuel injects the fuel from an injection port at a location below a top of an exhaust port from the cylinder.

18. In an internal combustion engine comprising a cylinder, a piston movably mounted in the cylinder, and a fuel injection system for injecting fuel into the cylinder, wherein the improvement comprises:

the piston having a top surface with a combined flow redirection and holding bowl recess, and the fuel injection system having an injection port located in a lateral side wall of the cylinder at a bottom section of a swept volume of the cylinder proximate the recess in the top surface of the piston for injecting fuel into the recess with a small space between the injection port and a receiving area of the recess when the piston is located proximate a bottom dead center position.

19. An engine as in Claim 18 wherein the injection port is pointed in a downward direction towards the top surface of the piston.

20. A method of controlling fuel injection flow in a cylinder of an internal combustion engine comprising steps of:

providing a piston head of the engine with a combined flow redirector and holding bowl recess extending into a top side of the piston head;

providing a fuel injection port in the cylinder in a bottom portion of a swept volume of the cylinder located above the top side of the piston head when the piston is at a bottom dead center position;

injection fuel from the injection port into the recess, wherein the step of injecting comprises:

injecting a first quantity of the fuel when the engine is operating at a first speed, and injecting a second larger quantity of the fuel when the engine is operating at a second faster speed, wherein the recess holds a substantial portion of the first quantity of the injection fuel when the fuel is injected at the first engine operating speed which is then subsequently transported in the recess to a spark plug of the engine as the piston moves towards a top dead center position, and wherein the recess redirects a substantial portion of the second quantity of the injected fuel out of the recess when the fuel is injected at the second faster engine operating speed.

21. A method as in Claim 20 wherein the cylinder comprises a transfer channel for transferring air from a crankcase of the engine into the combustion chamber, wherein a top of the transfer channel is located below the fuel injection port, and wherein the air from the crankcase is injected from the transfer channel above a path of the injected fuel from the injection port to the piston head.

22. A method as in Claim 20 further comprising injecting air into the combustion chamber above the fuel injected at the injection port to form an air fence above the recess when the engine is operating at the first speed to trap the substantial portion of the first quantity of the fuel in the recess when the fuel is injected into the recess.

23. A method as in Claim 20 wherein the step of injecting fuel directs the fuel in a downward direction from a lateral side of the cylinder towards the top side of the piston head.

24. A method as in Claim 23 wherein the step of injecting fuel injects the fuel from the injection port at a location below a top of an exhaust port from the cylinder.

25. A method as in Claim 20 further comprising moving a valve in an exhaust port to at least partially close the exhaust port during light engine load or idle operation of the engine.

26. A method as in Claim 20 wherein the step of injecting the fuel at the second faster engine operating speed comprises the recess redirecting a path of the substantial portion of the injected fuel out of the recess between about 120° to 150° from an initial injection direction into the recess.

* * * * *

UNITED STATES PATENT AND TRADEMARK OFFICE
CERTIFICATE OF CORRECTION

PATENT NO.    : 6,382,176 B1
DATED         : May 7, 2002
INVENTOR(S)   : Cobb, Jr.

It is certified that error appears in the above-identified patent and that said Letters Patent is hereby corrected as shown below:

Column 7,
Line 63, after "the exhaust port during light load or" delete "die" and insert
-- idle --

Signed and Sealed this

Eighth Day of October, 2002

Attest:

JAMES E. ROGAN
Attesting Officer    Director of the United States Patent and Trademark Office